No. 865,631. PATENTED SEPT. 10, 1907.
F. P. COTTER.
CHECK VALVE.
APPLICATION FILED NOV. 26, 1906.

Witnesses
Edwin L. Yewell
Thomas Durant

Inventor
Frank P. Cotter
By
his Attorneys

UNITED STATES PATENT OFFICE.

FRANK P. COTTER, OF AUGUSTA, GEORGIA.

CHECK-VALVE.

No. 865,631.　　　　Specification of Letters Patent.　　　　Patented Sept. 10, 1907.

Application filed November 26, 1906. Serial No. 345,147.

*To all whom it may concern:*

Be it known that I, FRANK P. COTTER, a citizen of the United States, residing at Augusta, in the county of Richmond, State of Georgia, have invented certain new and useful Improvements in Check-Valves; and I do hereby declare the following to be a full, clear, and exact description of the same, reference being had to the accompanying drawings, forming a part of this specification, and to the figures and letters of reference marked thereon.

This invention relates to check valves and more particularly, though not exclusively, to check valves especially adapted for use in connection with steam boilers, such, for instance, as locomotive boilers where the valve is subjected to transverse movements such as are calculated to disturb the seating or cause undue wear in the valve stems of ordinary check valves.

The object of the invention is to provide a simple self seating check valve, adapted to be connected in the pipe connections without requiring special fittings and which may be readily opened for inspection or repair.

The invention consists in certain novel details of construction and combinations and arrangements of parts, all as will be more particularly described and pointed out in the appended claims.

Figure 1:
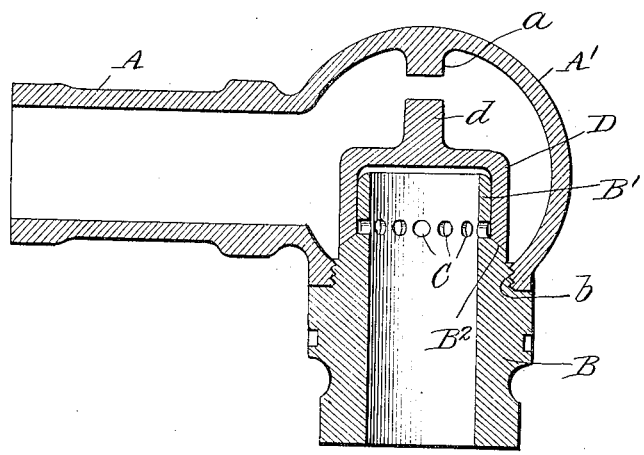
Figure 2:
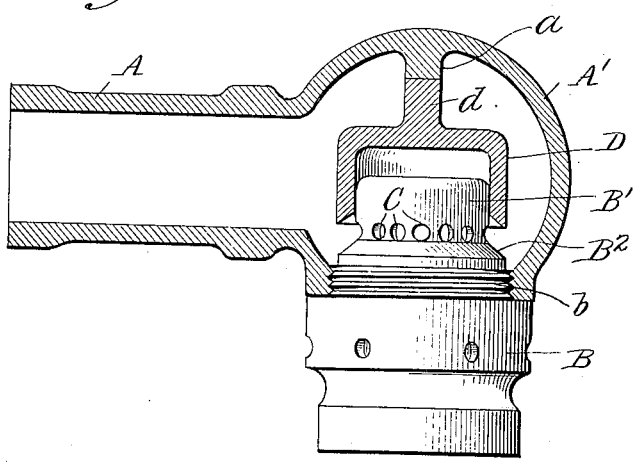

In the accompanying drawing—Figure 1 is a section through a valve embodying the present improvements. Fig. 2 is a similar section but with the valve support and seat in elevation, the movable part or valve in this view being shown in its open position.

Like letters of reference in the several figures indicate the same parts.

The body of the valve fitting indicated by the letter A in the accompanying drawings is at one end formed for attachment to or coupling in with the ordinary pipe fittings, extending between the water supply and boiler and at its opposite end is formed with a chamber, preferably dome shaped, as indicated at A′, in which the valve and its seat are located. At one side, preferably at right angles to the body A of the fitting, the dome A′ is provided with a threaded aperture of a diameter slightly greater than the transverse diameter of the valve itself, whereby said valve with its support may be inserted through the threaded aperture and the aperture closed by the threaded neck *b* of the valve seat fitting B. The valve seat fitting B at its outer end is also formed for connection in the pipe connection between the boiler and water supply, while at its inner end it is formed into a cylindrical projection or guide B′ near the base of which the inlet apertures C are formed. Below said apertures and on the outer side of the fitting B an inclined seat B² is formed, on which a cup valve D is adapted to seat. The cup valve D surrounds and is guided by the cylindrical projection B′, the movement of the valve upwardly being limited by a projection *d* on the valve itself contacting with a projection *a* on the inner side of the dome A′. With this construction it will be noted that the entire inner area of the top of the valve is effective for opening and closing the same and while the side walls of the valve practically close the entrance apertures as the valve closes the final sealing or seating takes place on the inclined seat B² and when in this position transverse movement of the valve on its seat is effectually prevented by the extended bearing surface, both of the seat itself and of the cylindrical projection B′ within the cup shaped valve, and, as a consequence, the valve may be subjected to excessive vibration without danger of wear to any appreciable degree. Even when in its open position the projection B′ will support the valve with an extended surface well calculated to resist wear or derangement of the parts.

In case of accident or sticking of the valve the two housings A and B may be readily separated and when separated the entire valve mechanism is exposed to view and may be quickly and easily repaired.

Having thus described my invention, what I claim as new and desire to secure by Letters Patent, is:—

A check valve embodying the following instrumentalities, to wit; a main housing having lateral and bottom apertures, the latter being of relatively large diameter and internally screw threaded, a fitting having a passage therethrough, an externally threaded neck screwed into the bottom aperture in the housing and an open ended cylindrical extension of less diameter than the neck, projecting vertically into the housing and having lateral openings near its base within the housing, a vertically movable cup shaped valve of less external diameter than the neck, inclosing and working vertically on the extension of the fitting, coöperating seats on the neck and lower edge of the valve and stop projections on the top of the valve and inside of the housing respectively, for limiting the upward movement of the valve.

FRANK P. COTTER.

Witnesses:
　J. P. BORTLEY,
　THOS. S. GRAY.